United States Patent [19]
Riddle et al.

[11] 4,320,490
[45] Mar. 16, 1982

[54] VIDEO DISC CARTRIDGE HAVING A SELF RETAINING ELECTRODE

[75] Inventors: George H. N. Riddle, Princeton, N.J.; Byron K. Taylor, Carmel, Ind.

[73] Assignee: RCA Corporation, New York, N.Y.

[21] Appl. No.: 104,370

[22] Filed: Dec. 17, 1979

[51] Int. Cl.³ .............................. G11B 9/06
[52] U.S. Cl. .................... 369/126; 369/43; 369/150
[58] Field of Search .............. 179/100.1 G, 100.1 B, 179/100.4 R, 100.4 M, 100.41 R, 100.41 G; 360/77–78, DIG. 1; 274/13 R, 23 A; 369/43, 126, 150

[56] References Cited

U.S. PATENT DOCUMENTS

| 2,319,622 | 5/1943 | Miessner | 179/100.41 G |
| 2,397,888 | 4/1946 | Snepvangers | 179/100.41 G |
| 2,400,953 | 5/1946 | Roys | 179/100.41 G |
| 2,417,712 | 3/1947 | Snepvangers | 179/100.41 G |
| 2,465,288 | 3/1949 | Sinnett | 179/100.41 G |
| 2,915,315 | 12/1959 | Rabinow | 274/13 |
| 3,572,724 | 3/1971 | Rabinow | 274/13 |
| 3,843,846 | 10/1974 | Miller | 179/100.41 G |
| 4,001,519 | 1/1977 | Rangabe | 179/100.41 G |
| 4,030,124 | 6/1977 | Allen | 179/100.4 R |
| 4,163,994 | 8/1979 | Sakamoto | 360/77 |

*Primary Examiner*—Raymond F. Cardillo, Jr.
*Attorney, Agent, or Firm*—E. M. Whitacre; J. S. Tripoli; E. P. Herrmann

[57] ABSTRACT

A cartridge for a video disc stylus having a stylus-position sensor, including an electrode mounted to the cartridge walls. An appendage is provided on the cartridge wall to position the sensor electrode proximate the stylus, the appendage being contoured to accept a preformed sensor electrode. The sensor electrode is formed from sufficiently resilient material to recover from deformation during electrode-appendage engagement and constrain itself to a particular position in the cartridge by compressive forces developed between the electrode and the appendage.

4 Claims, 3 Drawing Figures

VIDEO DISC CARTRIDGE HAVING A SELF RETAINING ELECTRODE

This invention relates to video disc stylus cartridges and in particular to a cartridge having an extended appendage contoured for positioning a stylus position-sensing electrode proximate the stylus end and wherein the stylus position sensing electrode is secured to the appendage by self-produced tensil forces.

Certain capacitive video disc systems incorporate record discs with information recorded by means of geometric variations in a spiral groove on the surface of a record disc. The bulk of the record disc may comprise a homogeneous conductive material with a thin dielectric layer disposed on its outer major surfaces. A pickup or signal stylus supported at one end of a stylus arm, and carrying a conductive electrode engages and tracks the groove. The other end of the stylus arm may be compliantly coupled to a carriage. The stylus electrode and conductive record material form a capacitance, which capacitance varies temporally as the groove translates with respect to the stylus in accordance with the geometric variations in the groove. Continuous capacitive changes resulting from rotating the disc to produce relative motion between the stylus and disc are detected and processed to produce video and/or audio signals for reproduction.

Video disc systems of the aforementioned type may utilize disc records having groove densities in the order of four to eight thousand groove convolutions per inch, and in some cases, close to ten thousand groove convolutions per inch. A typical video disc record of this type may have a groove convolution spacing in the order of 2.7 microns. The shallow walls of relatively narrow grooves of the disc record cannot be dependably relied upon to pull the weight of the pickup arm assembly, across the entire recorded surface of the disc record. Also in video disc systems utilizing the capacitive pickup concept, it is desirable for accurate reproduction of the prerecorded signals that the signal pickup electrode maintain a substantially constant attitude in the spiral groove. Therefore, the arm supporting structure (including the carriage) includes a radial drive mechanism for traversing the supported end of the pickup arm in proper time relationship with the radial motion of the signal pickup tip engaged in the spiral groove so as to continuously maintain the longitudinal axis of the pickup arm substantially tangential to the spiral groove at the point of engagement.

In order to effect the foregoing, the radial drive means is conditioned to translate the carriage responsive to the relative position of the stylus/stylus arm with respect to the carriage. The relative position can be sensed or monitored by means of the variation in capacitance exhibited by an air-gap capacitor formed between the conductive flylead connecting the stylus to the video detection circuitry and an electrode secured to the carriage. Typically, the stylus assembly is arranged in a cartridge, removably mounted in the carriage assembly with one of the position sensing capacitor electrodes mounted on the cartridge. One such stylus position sensing apparatus is described in U.S. Patent application Ser. No. 55,648 entitled, "Video Disc Player Having Stylus Position Sensing Apparatus" filed July 7, 1979 and assigned to the same assignee as the present invention.

In basic terms, the operation of the position sensor includes the application of a signal of fixed frequency to the sensing electrode and then measuring the relative amplitude of the fixed frequency coupled to the stylus flylead. The amplitude of the signal coupled to the flylead predictably increases with decreasing distance between the electrode and the flylead.

In prior arrangements, the sensing electrode has comprised a thin metallic strip mounted to an inner surface of the cartridge proximate either the flylead or another metal electrode secured to the stylus arm. Typically the metal strip has been secured by an adhesive material. Occasionally, this adhesive material has not provided the desired level of permanence.

The present invention comprises, in combination, a cartridge contoured for receiving a resilient preformed sensing electrode susceptible of constraining itself to a particular position in the cartridge by inherent tensil forces developed between the electrode and the cartridge.

Figure 1:
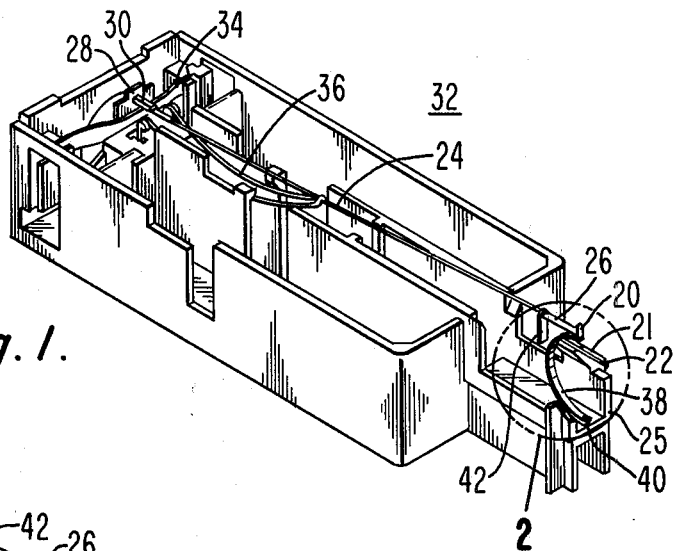
FIG. 1 is a perspective drawing of a stylus assembly cartridge embodying the present invention.
Figure 2:
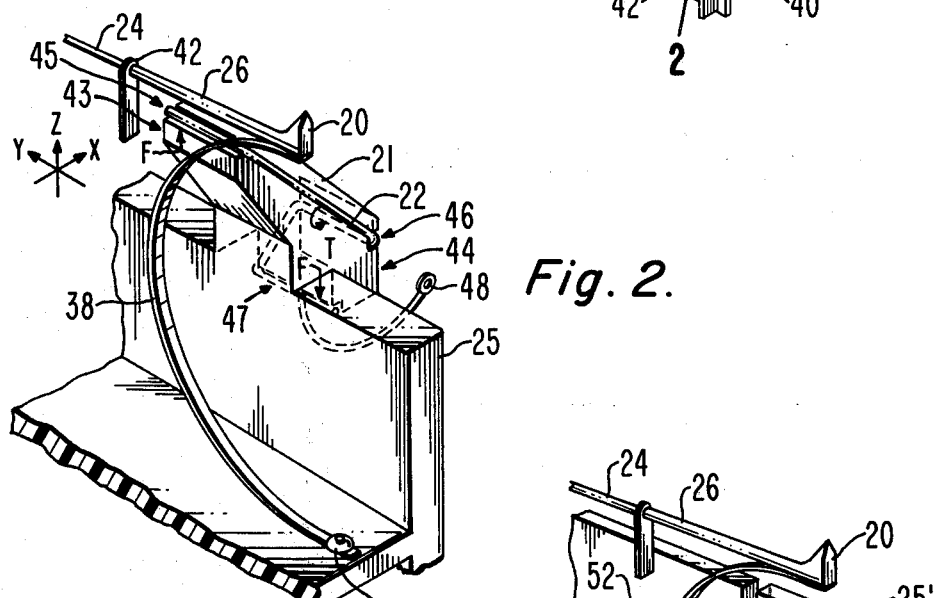
FIG. 2 is a partial schematic of the FIG. 1 cartridge showing the stylus position sensing electrode with more particularity.

The cartridge 32 in FIGS. 1 and 2 is of the type which is removably mounted within the carriage assembly of a video disc player. In the cartridge, a signal pickup stylus 20 is secured to the free end of a stylus arm 24 by means of a stylus holder 26. The other end of the stylus arm 24 is secured to a connector plate 28 by means of a compliant coupler 30. The connector plate 28 is suspended in the pickup cartridge 32 by means of a flexible diaphragm 34. A U-shaped spring 36 serves to retain the delicate stylus assembly within the confines of the cartridge body during its storage and handling. A conductive leaf spring 38 (i.e., flylead) connects the pickup stylus electrode to a terminal 40 on the cartridge body. An extension 42 is disposed on the stylus holder for constraining side-to-side excursions of the stylus.

Molded into the sidewall 25 of the cartridge 32 is an appendage or extension 21 which protrudes from the sidewall 25 inward toward and proximate the plane formed by the intersection of the stylus arm and flylead. On the innermost face 43 of appendage 21 a contour 45 is provided for receiving the position sensor electrode 22. An opposite face 44 of the appendage is provided with a similar contour 46 and a further contour 47 is arranged in an opposite relation to contour 46. The sensor electrode 22 is preformed to fit the contour 47, wrap generally in a helical manner around the appendage 21, enagage the contour 46, wrap further in a generally helical manner about the appendage and finally engaging the contour 45. Electrical connection is made to the sensor electrode 22 via the connecting wire 48.

The shape of the sensor electrode 22 is arranged such that when fitted in the contours of the appendage a torque T is developed in that section of the electrode engaged in contour 46 conditioning the electrode to exhibit compression F between itself and the walls of contours 45 and 47. The compression develops sufficient frictional force between the electrode and the appendage to inhibit relative movement between the two elements.

The contour 45 and the electrode therein is generally parallel to the stylus arm 24. This portion of the electrode is of sufficient length to ensure that the flylead 38 remains adjacent to a section of this portion of the electrode during "Z" directed movement of the stylus and concomitant "Y" directed motion of the flylead during playback. This arrangement generally maintains the capacitance realized between the sensor electrode 22 and the flylead 38 constant, for both "Z" and "Y" directed stylus movement when there is no "X" directed stylus movement relative to the cartridge wall 25.

The sensor electrode 22 must be sufficiently resilient to undergo minor deformations during assembly and return to the preformed shape, yet, it must be sufficiently stiff and elastic to retain a torque indefinitely about its central section so as to develop continuous compression in its two end sections and, it must be capable of conducting electrical charges. Particular examples of acceptable material are piano wire or beryllium/copper alloy spring material.

Figure 3:
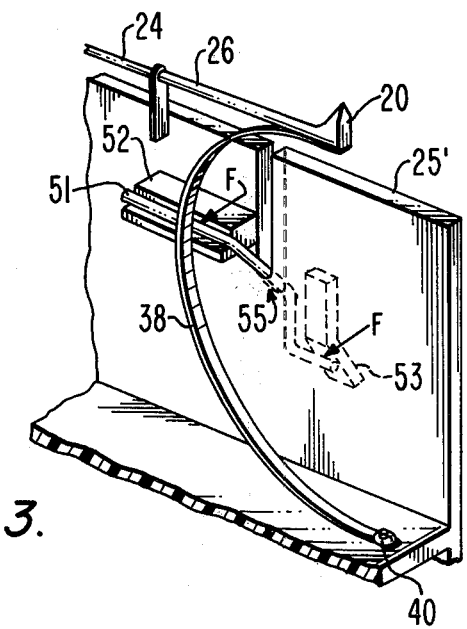
FIG. 3 is partial schematic of a stylus assembly cartridge illustrating a further embodiment of the present invention.

FIG. 3 illustrates a second example of a cartridge having a self-retaining position sensing electrode. In the drawing, the cartridge wall 25' contains an interior projection 52 thereon contoured for positioning a section of sensing electrode 51 in a prescribed spatial relation with reference to the flylead 38. The sensing electrode 51 is configured to pass through the cartridge wall 25' where it is engaged by a second projection 53 located on the exterior face of the wall 25'. The electrode 51 is preformed such that the two projections effect counterposing forces about the point 55 as a fulcrum where the electrode passes through the wall. These faces generate sufficient friction between the electrode 51 and the projections 52 and 53 to retain the electrode in a substantially fixed relation with the cartridge.

In both the FIG. 2 and FIG. 3 embodiments, the sensing electrode has further connection to signal processing circuitry, which connection may be a wire filament arranged to be situated between the sensing electrode and the contour walls or projections. The compression exerted by the electrode toward the contour walls will secure the filament therebetween and assure electrical connection.

The embodiments illustrated are exemplary only and one skilled in the art can readily devise variations without straying from the spirit of the invention, and the claims should be construed accordingly.

What is claimed is:

1. A cartridge for a video disc stylus assembly comprising:
   a casing having walls defining protective enclosure;
   a signal pickup stylus secured to a first end of an elongated stylus arm;
   means for mounting a second end of the elongated stylus arm to said cartridge, said means permitting limited pivotal and longitudinal motion of said stylus arm;
   first conductive means secured to the elongated stylus arm relatively near the stylus and arranged to move in accordance with stylus movement, said first conductive means having a connection to a terminal on the cartridge.
   an appendage to one of said casing walls for receiving a second conductive means and positioning a portion of said second conductive means proximate the first conductive means for forming a variable capacitance therebetween at a point relatively near the signal pickup stylus when said signal pickup stylus is in its play position; and wherein
   the second conductive means has a first extension engaging the appendage, a second extension engaging the cartridge wall supporting said appendage and a midsection contiguous with said first and second extensions, said midsection being elastically deformed when said second conductive means is mounted on the cartridge for developing compressive forces between the respective extensions and the appendage and cartridge wall for self retention of the second conductive means securely thereto.

2. The cartridge as set forth in claim 1 wherein the appendage is integral to one of the casing walls.

3. A cartridge for a video disc stylus assembly comprising:
   a casing having walls defining a protective enclosure;
   a signal pickup stylus secured to a first end of an elongated stylus arm;
   means for mounting a second end of the elongated stylus arm to said cartridge, said means permitting limited pivotal and longitudinal motion of said stylus arm;
   first conductive means secured to the elongated stylus arm relatively near the stylus and arranged to move in accordance with stylus movement, said first conductive means having a connection to a terminal on the cartridge;
   an appendage to one of said casing walls for positioning a second conductive means proximate the first conductive means for forming a variable capacitance therebetween at a point relatively near the signal pickup stylus when said signal pickup stylus is in its play position;
   said appendage having a first groove located generally at a first end thereof, said groove disposed on a first face of the appendage proximate the first conductive means and parallel to the plane defined by the first conductive means and the elongated stylus arm, said appendage further having a second groove disposed on a second surface of said appendage and located generally between a first and second end thereof, said appendage additionally having a third groove located proximate the second end of said appendage, said first, second and third grooves being arranged for receiving said second conductive means; and
   second conductive means having a first and second extension respectively engaging said first and third grooves, and having a midsection joining said first and second extensions in a contiguous element, the midsection being elastically deformed when said second conductive means is mounted on the appendage, the elastic deformation developing compressive forces between the respective extensions and grooves for holding the second conductive means securely thereto.

4. The cartridge as set forth in claim 3 wherein the second conductive means comprises a generally "S" shaped member wherein the top and middle elements of the "S" shaped member are parallel and are arranged to be received in the first and second grooves of the appendage respectively, the "S" shaped member wrapping in a generally helical fashion about the appendage, and preformed such that the top and bottom of said "S" shaped member when in said first and third grooves exhibit counterposing forces about the middle portion in the second groove to generate sufficient friction to maintain itself immobile relative to said appendage; and
   means for connecting said "S" shaped member for electrical conduction.

* * * * *